W. J. COOK.
Cotton Seed Planters.

No. 155,294.    Patented Sept. 22, 1874.

Witnesses:

Inventor:
William J. Cook,
by Johnson and Johnson
his Attorneys.
Washington, D.C.

UNITED STATES PATENT OFFICE.

WILLIAM J. COOK, OF DAWSON, GEORGIA, ASSIGNOR OF ONE-HALF HIS RIGHT TO LUCIUS W. STEWART, OF SAME PLACE.

IMPROVEMENT IN COTTON-SEED PLANTERS.

Specification forming part of Letters Patent No. 155,294, dated September 22, 1874; application filed February 13, 1874.

*To all whom it may concern:*

Be it known that I, WILLIAM J. COOK, of Dawson, in the county of Terrell and State of Georgia, have invented a new and useful Improvement in Cotton-Seed Planters, of which the following is a specification:

My invention relates to machines for planting cotton-seed; and my improvement consists in the combination, with the open-troughed wheel and the vibrating seed-stirrers, of a slotted arm and uniting-link, connecting a crank on said troughed wheel directly with a crank on the axis of the stirring-fingers, and thereby cause the troughed receiver and conductor to vibrate the stirrers within said trough.

Figure 1:
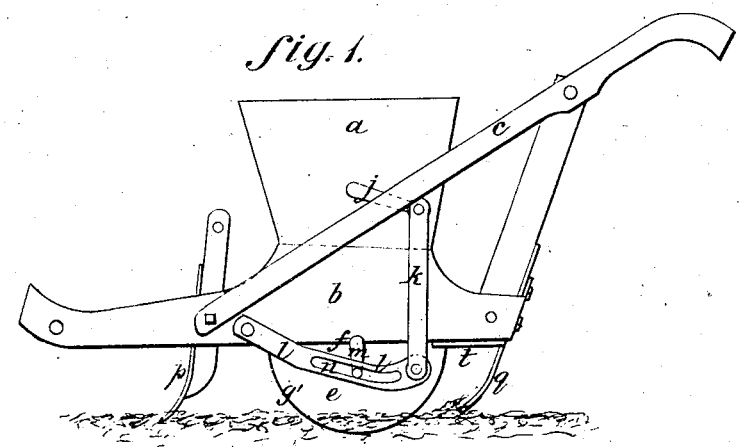
Figure 2:
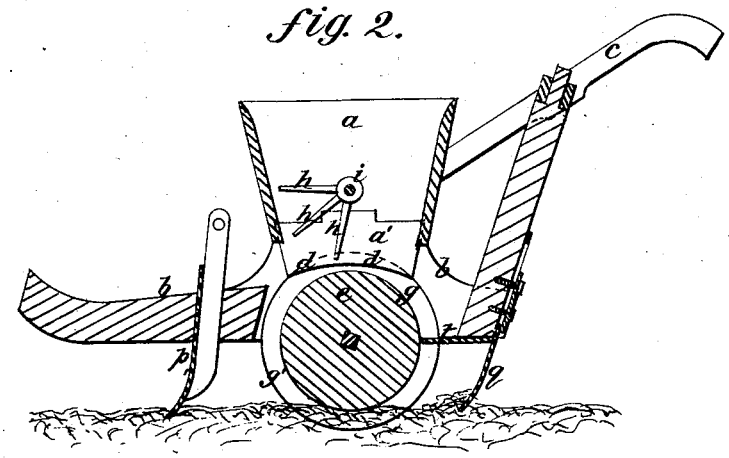

In the accompanying drawings, Figure 1 represents a side elevation of a cotton-seed planter embracing my invention; Fig. 2, a vertical section, and Fig. 3 a transverse section, of the same.

Figure 3:
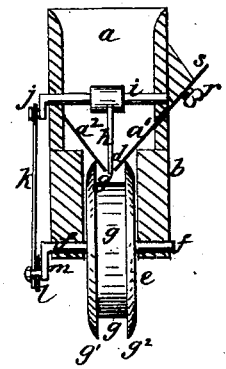

The seed receiving and feeding hopper $a$ is mounted upon a frame, $b$, having handles $c$ by which to guide and steady it. The bottom of the hopper has oppositely-inclined sides $a^1$ $a^2$, to form the discharge-aperture $d$ between them, and directly below this oblong aperture a vertically-revolving wheel, $e$, is mounted in bearings $f$ in the frame, and has a trough, $g$, formed round its circumference, into which the inclined bottom sides $a^1$ $a^2$ of the hopper project, so that the wheel-trough $g$ must form a continuation of the hopper-aperture $d$, to receive, confine, and conduct the seed directly into the furrows, the open trough $g$ forming, in effect, the sides of the hopper-aperture, as shown in Figs. 2 and 3. The side $a^1$ is made adjustable to increase or diminish the area of the aperture $d$, to feed more or less seed, and it is held in place by a screw, $r$, passing through a slot in a stem, $s$, of the slide outside of the hopper. Within the opening $d$ of the hopper, and within the trough $g$ of the wheel, stirring-fingers $h$ are arranged to project from an axis-rod, $i$, passing through the sides of the hopper, above its inclined bottom $a^1$ $a^2$, and these fingers are caused to vibrate within the aperture $d$ and trough $g$ by a crank, $j$, on the stirrer-axis $i$, outside of the hopper, connecting with a link, $k$, which unites with a slotted arm, $l$, pivoted to the frame forward of the hopper, and vibrated by a crank, $m$, from the troughed wheel, working in the slot $n$ of said pivoted arm $l$, so that the revolution of the troughed receiving and conducting wheel vibrates the said arm $l$ and link $k$, to carry the fingers $h$ back and forth within the hopper-aperture and the trough, the length of the slot $n$ being sufficient to allow the wheel-crank $m$ to revolve and carry the arm $l$ up and down. The sides $g^1$ $g^2$ of the trough $g$ inclose the inclined sides $a^1$ $a^2$ of the hopper-bottom, and thus form guards to prevent the stirring-fingers from throwing the seed to either side, but must conduct them forward down into the soil by the revolution of the wheel, and in this way keep the seed within the furrow, and avoid scattering, as would be the case from an open bottom, as cotton-seed cannot be effectually and uniformly planted through tubes, as such seed is constantly liable to become clogged and to choke up closed conducting devices; but the wheel-trough $g$ being always open, and in open connection with an open hopper, the feed is regular and free. A colter, $p$, passing through the frame forward of the hopper, opens the furrow for the seed, and a forked cover, $q$, at the rear of the frame covers the seed as it is deposited from the open-troughed wheel, while a scraper, $t$, prevents the trough of the wheel carrying the soil into the opening $d$ of the hopper.

I claim—

The cranks $j$ $m$, connected by the link $k$ and the slotted arm $l$ $m$, in combination with the open-troughed wheel $e$ $g$ and the vibrating stirring-fingers $h$ of the hopper, as shown, and for the purpose set forth.

WILLIAM J. COOK.

Witnesses:
J. W. LENNARD,
L. W. STEWART.